United States Patent
Whitney et al.

[11] Patent Number: 5,887,855
[45] Date of Patent: Mar. 30, 1999

[54] ELECTRONICS INSTALLATION HAND TOOL SYSTEM

[76] Inventors: Dain M. Whitney, 1464 Doctor Beatrous Rd., Theriot, La. 70397; Reed C. Whitney, 8524 Hickcock Dr., Baton Rouge, La. 70811

[21] Appl. No.: 774,098

[22] Filed: Dec. 24, 1996

[51] Int. Cl.⁶ .................................................. H02G 1/08
[52] U.S. Cl. .................................................. 254/134.3 R
[58] Field of Search .................. 254/134.3 R, 134.3 FT, 254/132; 81/177.1, 489; 269/1, 3, 16

[56] References Cited

U.S. PATENT DOCUMENTS

| | | |
|---|---|---|
| 834,344 | 2/1907 | Linderman . |
| 903,818 | 11/1908 | Herth .............................. 254/134.3 FT |
| 1,783,256 | 12/1930 | Miller ............................... 254/134.3 R |
| 1,959,490 | 5/1934 | Mistelski ......................... 254/134.3 FT |
| 2,727,721 | 12/1955 | Pinkerton . |
| 3,610,582 | 10/1971 | Passoni ........................... 254/134.3 FT |
| 3,872,806 | 3/1975 | Bone . |
| 4,054,264 | 10/1977 | Elversson ........................ 254/134.3 FT |
| 5,458,317 | 10/1995 | Caracofe et al. . |
| 5,503,369 | 4/1996 | Frost et al. ...................... 254/134.3 FT |

*Primary Examiner*—David A. Scherbel
*Assistant Examiner*—Lee Wilson

*Attorney, Agent, or Firm*—C. Emmett Pugh; Pugh Associates

[57] ABSTRACT

A hand tool (1, FIG. 1) for use in electronics installations in a vehicle (3, FIG. 3), in which one or more wires 4 need to be run through, for example, the fire wall 5 of the vehicle, in installing, for example, car phones, stereos, and the like. The tool consists of, a hollow shaft (10) inserted into a handle (11) with supplemental adhesive (14) included to prevent the shaft from coming out of the distal end (15) of the handle and a channel (12) through the handle along its axis in alignment with the hollow interior of the shaft. The shaft is restricted from ever extending all the way through the handle by a blocking flange, shoulder or shelf (13) extending about the interior periphery of the channel of the tool, which mechanical or physical blocking element is an important part of the improvement of the present invention over the prior art of electronics installations tools, and prevents the hollow, typically metal, shaft from being able to move down and protrude out of the base or bottom handle end (16) and, for example, potentially injuring a user of the tool, as the user pushes hard on the tool to move the distal or top end (19) of the shaft through, for example, a tight, packed grommet (2, FIGS. 2 & 3), as has occurred in prior art tools which have the shaft extend from end-to-end of the tool handle, securing the shaft to the handle only with adhesive which has failed.

10 Claims, 2 Drawing Sheets

ELECTRONICS INSTALLATION HAND TOOL SYSTEM

TECHNICAL FIELD

The present invention relates to a electronics installation tool system, and more particularly to an improved means for installing electronic accessories into, for example, vehicles, in which the basic tool used comprises a hand tool having a hollow shaft inserted into and through a handle which allows wire to be inserted into and through itself and thus through a barrier wall such as, for example, the fire wall in a vehicle.

BACKGROUND ART

It is known in the art of installing electronic accessories in a vehicle, in which one or more wires need to be run through, for example, the fire wall of the vehicle, to use a hand tool comprising a hollow, typically metal, pass-through shaft which is inserted into and completely through a handle held by the user during use. There is a mating channel through the handle along its axis in alignment with the hollow shaft, which shaft is secured to the handle only by glue or other adhesive.

In the installation of electronic vehicle accessories, such as, for example, car phones, stereos, and the like, wires generally need to pass from the dash board or passenger area, through the fire wall of a vehicle, and into the engine area to provide electrical power to the accessory. The fire wall typically contains a rubber grommet or ring, which securely holds wires passing through the fire wall, while protecting the integrity of the fire wall itself. The prior art tool is used to facilitate such wiring.

In use, the prior art hand tool is inserted through the grommet, and then the wiring of the accessory to be installed is passed internally through the tool to feed it from one side of the fire wall to the other side. It is next to impossible to feed the wiring without the aid of the tool since the grommet space is small and the wire is generally flexible and typically, in and of itself, cannot be used to be forced through the grommet area. The prior art tool therefore provides a rigid access through the grommet.

However, such prior art tools in present usage secure the pass-through tube or shaft inside the handle only with glue or other adhesive, which adhesive ultimately can fail and break away, allowing the bottom or proximal end of the metal tube or shaft to be forced out of the bottom of the handle, potentially cutting the user, which clearly has been a very unsafe situation.

In spite of these safety problems, the prior art tool has been in use for many years and there has been a long-felt want and need for a more safe, hand, wire installation tool.

A list of prior patents which may also be of interest is provided below:

| U.S. Pat. No. | Inventor | Patent Date |
|---|---|---|
| 834,344 | Linderman | 05 FEB 1907 |
| 2,727,721 | Pinkerton | 20 DEC 1955 |
| 3,872,806 | Bone | 25 MAR 1975 |
| 5,458,317 | Caracofe et al. | 17 OCT 1995 |

The Linderman (U.S. Pat. No. 843,344) patent is directed to a belt splicing device comprised of a handle and a tubular body with the body having one end fixed within the handle and the other end beveled, sharpened, and shaped to a point for cutting a hole in a belt. The tubular body further has two wedge-shaped, diametrically opposed holes which are used to grasp a lacing thong or cord for insertion through the tubular body and through a hole in the belt. There is no hole or channel through the handle of the tool, and therefore no flange holding a tubular body within the handle.

The Pinkerton (U.S. Pat. No. 2,727,721) patent is directed to a tool for guiding wire, particularly conductor wire, through a junction box. The tool is comprised of a handle with a metal shank. On the end of the shank is a pair of opposed flat oval plates with a grooved pulley journaled therebetween. It is disclosed that, through the use of the tool, wire can be pulled out of the junction box, guided smoothly by the pulley, without any kinking or damage to the wire. However, again there is no hole or channel through the handle of the tool.

The Bone (U.S. Pat. No. 3,872,806) patent is directed to a needle for fastener attachment insertion devices. The needle is comprised of a hollow shaft with a spoon-shaped cutout on the insertion end for guiding the fastener attachment member as it is inserted. The fastener attachment member is initially inserted into and through the needle via a cutout portion (see FIG. 1, reference number 15) in the mounting portion of the needle. The needle is mounted into a fastener attachment insertion device so there is no handle as in the present invention.

The Caracofe et al. (U.S. Pat. No. 5,458,317) patent is directed to a device for grasping cable or wire in confined spaces to aid in its installation, adjustment or removal. The device is comprised of an elongated handle, and a spring wire, circular head portion which narrows as it approaches the handle. A cable or bundle of cables is received into the tool through the circular head and is slid down into the narrow section where it is retained by the compressive force of the two wires held by the handle.

It is noted that none of the above referenced devices are comprised of a handle through which wire is fed requiring the safe securing of a shaft of a hand manipulated tool within a handle. Additionally, none of the devices have a shaft which is secured within the handle of the tool at a flange, to prevent the possible sliding of the shaft through the handle. Also, the prior art does not include or teach the over-all system aspects of the present invention as related to these basic, structural differences.

Thus, there is significant, unobvious, novelty in the present invention.

GENERAL SUMMARY DISCUSSION OF INVENTION

The electronics installation tool system of the present invention provides inter alia an improved means for installing electronic accessories into, for example and particular, a vehicle, in which one or more wires need to be run through, for example, the fire wall of the vehicle.

The tool comprises and indeed, in the preferred embodiment, consists of a hollow shaft which is inserted into a handle. There is a channel through the handle along its axis in alignment with the hollow shaft. In the preferred embodiment of the invention, the shaft is restricted. from extending all the way through the handle by a flange or shelf, which is an important part of the improvement over the prior art.

The tool system of the present invention is used to facilitate the wiring of, for example and particularly, electronic vehicle accessories such as, for example, car phones, stereos, and the like. In such installations, wires generally need to pass from the dash or passenger area, through the fire wall of a vehicle, and into the engine area. The fire wall typically contains a rubber grommet or ring which securely holds wires passing through the fire wall, while protecting the integrity of the fire wall itself.

In use, the hand tool is inserted through the grommet and then the wiring of the accessory to be installed is passed internally through the tool to feed it from one side of the fire wall to the other side. It is next to impossible to feed the wiring without the aid of the tool since the grommet space is small and the wire is generally flexible and typically, in and of itself, cannot be used to be forced through the grommet area. The tool of the present invention therefore provides a rigid access through the grommet.

The flange or shelf inside the handle of the tool serves as a holding block and prevents the hollow metal shaft from protruding out of the base or bottom handle end and, for example, injuring a user of the tool as the user pushes the tool through the grommet. Tools in present usage lack this flange and secure the pass-through channel inside the handle with glue or other adhesive only, which ultimately can fail and break away, allowing the bottom or proximal end of the metal channel or tube to be forced out of the bottom of the handle, potentially cutting the user. The internal, mechanical blocking flange or shelf of the invention represents a significant improvement over the prior art and improves both the usability and safety of the tool.

It is thus a basic object of the present invention to provide a substantially improved hand tool which is safer to use than the comparable hand tools of the prior art.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
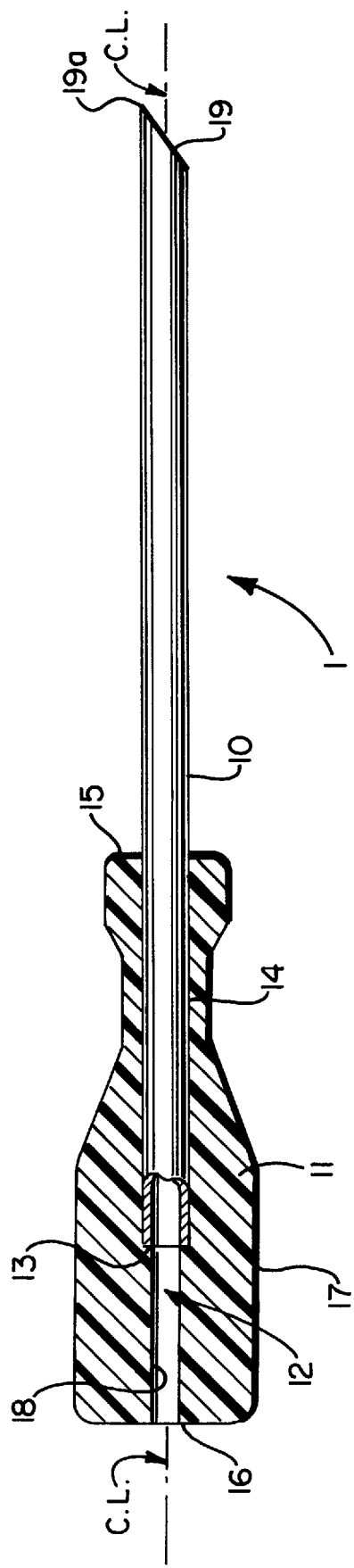
FIG. 1 is a side view of the preferred, exemplary embodiment of the electronics installation tool of the present invention, with the tool handle shown in cross-section and with the tool shaft partially cut-away at its proximal or bottom end, which tool is symmetrical about its longitudinal center-line "C.L." except for the distal tip of the hollow tool shaft which has a bias-cut producing a pointed edge at one side thereof.

With reference to FIG. 1, the exemplary, preferred embodiment of the hand tool 1 for use in electronics installations comprises, and indeed, in the preferred embodiment consists of, a hollow, preferably stiff or rigid shaft 10 inserted into a handle 11 with supplemental adhesive 14 included along a portion of the concentric interfacing surfaces between the handle and shaft to prevent the shaft from coming out of the distal end 15 of the handle. There is a channel 12 through the handle 11 along its axis in alignment with the hollow shaft 10.

The shaft 10 is restricted from ever extending all the way through the handle 11 by a blocking flange, shoulder or shelf 13 extending about the interior periphery of the channel 12 of the tool 1, against which the bottom end of the shaft abuts. This mechanical or physical blocking element 13 is an important part of the improvement of the present invention over the prior art of electronics installations in which wires need to be placed and passed through a barrier wall.

Preferably the shelf 13 forms a continuous, circular ledge (similar in configuration to a washer) about the full three hundred and sixty (360°) degrees of the interior periphery of the handle channel 12, but, if so desired, one could segment the shelf using, for example, a series of spaced, shelf portions, as long as there was a sufficiently strong, physical or mechanical block provided by the shelf portion.

Figure 2:
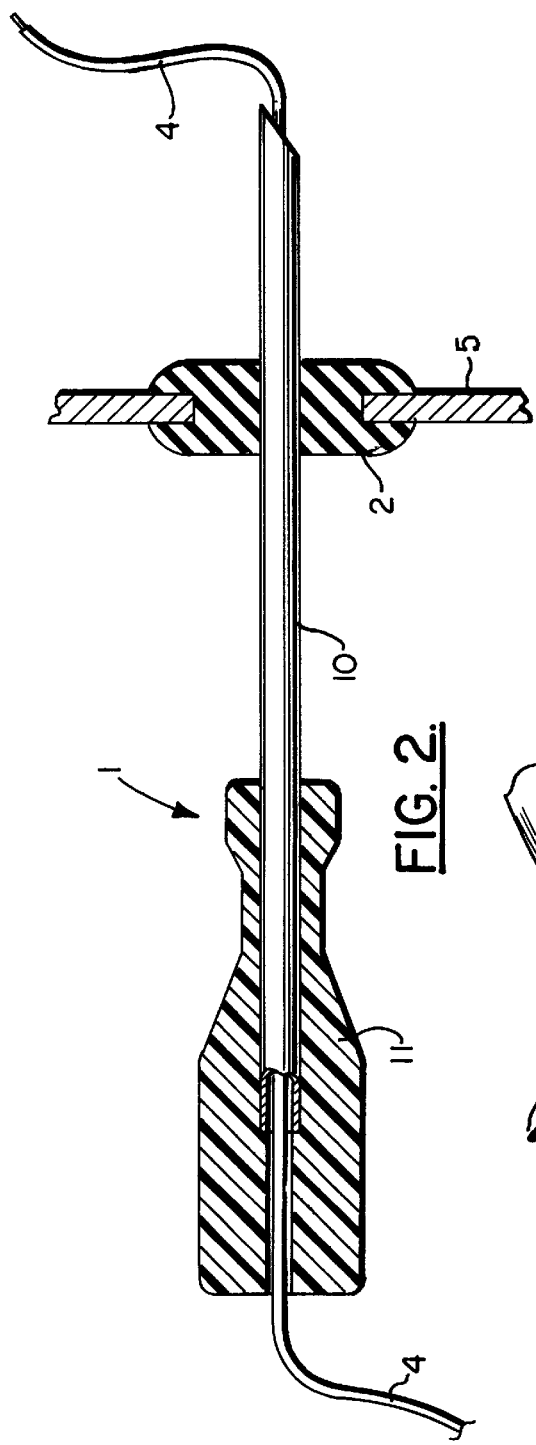
FIG. 2 is a side view, partially in cross-section and partially cut-away, of the preferred, exemplary embodiment of the electronics installation tool of the present invention, substantively identical to FIG. 1, but also showing the passing of exemplary electrical wire through the internal channel of the tool, going completely through the tool shaft and the handle channel of the tool, end-to-end and extending pass each end of the tool, and with the tool extending through a standard, exemplary, rubber grommet.
Figure 3:
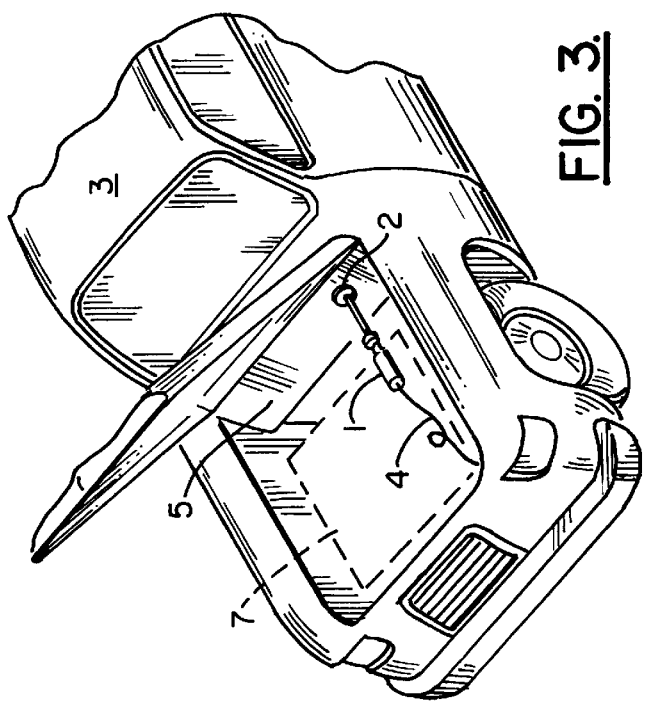
FIG. 3 is a perspective, simplified view of an exemplary vehicle with its hood up showing the hand tool of FIGS. 1 & 2 being used to pass electrical wire through the grommet (like FIG. 2) of the vehicle's fire wall, with the view being substantially out-of-scale with respect to the relative sizes of the tool and the vehicle to more clearly show the tool and its position.

The flange or shelf 13 inside the handle 11 of the tool 1 serves as a holding block and prevents the hollow, typically metal, shaft 10 from being able to move down and protrude out of the base or bottom handle end 16 and, for example, potentially injuring a user of the tool 1 as the user pushes hard on the tool to move the distal or top end 19 of the shaft 10 through, for example, a tight, packed grommet (see element 2 in FIGS. 2 & 3).

The shaft 10 extends down into the handle 11 a substantial distance preferably in a ratio of the longitudinal lengths of the smaller, interior size portion to the larger interior size portion of the handle channel 12 is in the range of about one to four (1:4) to about one to three (1:3), and preferably about one to four (1:4). There preferably needs to be a greater depth in the handle 11 for firmly holding the lower portion of the shaft 10, while also having enough depth to the lower end portion of the handle to provide sufficient backup strength behind the flange, shoulder shelf 13 to withstand the maximum design force that might be applied down against the shelf by the forces applied down along the longitudinal length of the shaft.

The handle 11 is preferably made of electrical insulating material which is effectively rigid at least in the area of its blocking flange or shoulder shelf 13 in a size to fit comfortably in the hand and can be made, for example, of molded plastic. The handle exterior 17 can either be smooth, as shown, or include a roughed surface and/or an undulating surface for enhanced grip.

The hollow shaft 10 can be made of, for example, stainless steel tubing, preferably with an inner diameter equal to the diameter of the proximal end portion 18 of the handle channel 12 and with a wall thickness nearly equal to the width or depth of the blocking shelf 13, providing maximum, mechanical or physical, interface blocking, while also providing a continuously smooth channel through the complete tool 1, including the interior interfacing edges of the proximal, bottom, handle channel 18 at the shoulder shelf 13 and the proximal or bottom end of the shaft tubing 10 for ease in passing wire through the tool channel.

Exemplary dimensions, subject to substantial variation, for the exemplary tool 1 are and over-all, exemplary length of nineteen (19") inches, with an exemplary handle length of five (5") inches and with the exposed length of the hollow shaft being about fourteen (14") inches, and with the hollow shaft 10 being a quarter (0.25") inch with a wall thickness of about a sixteenth (1/16") of an inch and hence an inner diameter of about a three-sixteenths (3/16") of an inch, stainless steel tubing in exemplary size.

For a proper, ideal, interfacing mating between the bottom of the shaft 10 and the facing surface of the shelf 13, the width or depth of the shelf should likewise be matched with the wall thickness of the tubing 10, and hence the inner diameter of the smaller size portion of the handle channel 12, between the shelf 13 and the bottom end 16 preferably should be the same as the inner diameter of the tubing, namely, for the exemplary: size, three-sixteenths (3/16") of an inch providing a shelf depth of one sixteenths (1/16") of an inch with the inner diameter of the larger size portion of the channel 12 between the shelf 13 and the upper handle end 15 substantially or nearly matched to the outer diameter of the tubing, namely, for the exemplary size, a quarter (1/4") of an inch. Such matching also produces a continuously smooth passageway for the insertion and passing through of the wire 4, with the continuous three-sixteenths (3/16") of an inch effective diameter of the channel provided within the overall tool 1 (including the handle 11 and the shaft 10) allowing the easy passage of up to about ten (10) gauge electrical wire, which is typically the largest size used in the installation of electronic accessories in vehicle wiring, down to physically a theoretical size of zero diameter but practically down to about twenty-two (22) gauge, which is about the smallest size wire used in such vehicular applications, particularly in retro-fit situations.

With reference to FIGS. 2 & 3, the exemplary embodiment of the electronics installation tool 1 provides inter alia an improved, safer means for installing electronic accessories into particularly a vehicle 3, in which one or more wires 4 need to be run through, for example, the fire wall 5 of the vehicle.

The tool 1 is used to facilitate the wiring particularly of electronic vehicle accessories such as, for example, car phones, stereos, and the like. In such installations, wires 4 generally need to pass from the dash or passenger area 6, through the fire wall 5 of the vehicle 3, and into the engine area 7. The fire wall 5 typically contains a rubber grommet or ring 2, which securely holds other wires passing through the fire wall, while protecting the integrity of the fire wall itself.

In use, the hand tool 1 is inserted through the grommet 2 (note FIG. 2) during which, as known to those of ordinary skill in the use of such hand tools, the handle 11 is placed in and across the palm of the user's hand gripped by the fingers and thereby held in the user's hand. Then the wiring 4 of the accessory to be installed is passed internally through the tool from end-to-end and out each end 16/19, respectively, to feed it from one side of the fire wall 5 to the other side (note both FIGS. 2 & 3). As in the prior art, the distal end 19 of the shaft 10 has a pointed tip 19a, created by a bias cut, i.e., a non-orthogonal cut, at the distal end of the hollow shaft, which eases the initial entry of the tool 1 through a tight, wire-packed, grommet ring 2.

It is next to impossible to feed the wiring 4 without the aid of the tool 1 since the grommet space is small and the wire 4 is generally flexible and typically, in and of itself, cannot be used to be forced through the grommet area. The tool 1 of the present invention therefore provides a rigid access channel through the grommet and hence through the fire wall.

As previously noted, the flange or shelf 13 inside the handle 11 of the tool 1 serves as a holding block and prevents the proximal, bottom end of the hollow metal shaft 10 from protruding out of the base or bottom handle end 16 and, for example, injuring a user of the tool as the user pushes hard on the handle 11 of the tool through the grommet 2. Prior art tools in present usage lack this flange and secure the pass-through tubing inside the handle, with has a uniform channel diameter through it, with glue or other adhesive only, which ultimately can fail and break away, allowing the bottom or proximal end of the metal channel or tube of the prior art to be forced out of the bottom of the handle, potentially cutting the user. The internal, mechanical blocking flange or shelf of the invention represents a significant improvement over the prior art and improves both the usability and safety of the tool.

The exemplary, preferred embodiment 1 of the electronics installation tool of FIG. 1 thus provides a substantially improved hand tool which is safer to use than the comparable hand tools of the prior art.

It is noted that the embodiment described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

We claim:

1. An electronics installation hand tool for passing wire up to about ten gauge electrical wire in size through a barrier wall in a vehicle and having no moving parts, consisting of:

a longitudinally extended, elongated handle suitable for fitting in and being held across the palm of the user's hand gripped by the user's fingers and held in the user's hand when in use and having a bottom, proximal end and a top, distal end, and an interior channel extending longitudinally completely through the handle from end-to-end, with said channel having two portions with different sizes, a smaller, interior size portion toward said bottom end and a larger, interior size portion at said top end, with a blocking flange, shoulder shelf portion extending about at least a substantial part of the interior periphery of said channel between said two interior portions, said smaller interior size having an inner size approximately equal to that of the exterior size of ten gauge electrical wire; and a longitudinally extended, elongated shaft, hollow from end-to-end and also having an interior size approximately equal to the exterior size of ten gauge electrical wire, said elongated shaft having a bottom, proximal end portion and a top, distal end portion, said channel and said hollow of said shaft being in open communication with one another, allowing up to about ten gauge wire to be passed completely through the tool from end-to-end of the tool from said bottom end of said handle through said top end of said shaft, said bottom portion extending down into said handle into said larger interior size portion, abutting against said flange, shoulder shelf portion and affixed to said larger interior size portion, said shaft being restricted from ever extending all the way through to said bottom portion of said handle by said blocking flange, shoulder shelf portion, preventing said bottom portion from being able to move down and protrude out of said bottom handle end; said handle and said shaft sharing a common centerline, and said handle shaft being always static and fixed with respect to one another, having no moving parts in use.

2. The electronics installation hand tool for passing wire through a barrier wall of claim 1, wherein:

said shaft is a rigid tube having an outer diameter of about one quarter (~¼") of an inch and an inner diameter of about a sixteenth (~¹⁄₁₆") of an inch; and wherein:

said shelf portion extends completely around the inner periphery of said channel forming a circular shelf with a width of about a sixteenth (~¹⁄₁₆") of an inch.

3. The electronics installation hand tool for passing wire through a barrier wall of claim 2, wherein:

said rigid tube is made of stainless steel.

4. The electronics installation hand tool for passing wire through a barrier wall of claim 1, wherein:

the ratio of the longitudinal lengths of said smaller, interior size portion to said larger interior size portion of said handle is in the range of about 1:4 to about 1:3.

5. The electronics installation hand tool for passing wire through a barrier wall of claim 4, wherein:

the ratio of the longitudinal lengths of said smaller, interior size portion to said larger interior size portion of said handle is about 1:4.

6. The electronics installation hand tool for passing wire through a barrier wall of claim 1, wherein:

said handle is made of molded plastic.

7. The electronics installation hand tool for passing wire through a barrier wall of claim 1, wherein:

said handle and said shaft are symmetrical about their longitudinal center-line except for said distal tip which has a bias-cut producing a pointed edge at one side thereof.

8. The electronics installation hand tool for passing wire through a barrier wall of claim 1, wherein:

said channel in said handle and said hollow of said shaft are completely in line with one another, forming a straight line, open but confined, enclosed path for the wire extending from the complete proximal end to the complete distal end of the tool.

9. The electronics installation hand tool for passing wire through a barrier wall of claim 8, wherein:

said channel of said handle and said hollow of said shaft are cylindrical from end to end; and wherein:

the inner diameters of said channel in said handle and said hollow of said shaft are substantially equal, providing a continuously smooth channel through the compete tool from said proximal end to said distal end of the tool.

10. A safety enhanced method of installing electronic accessories using a hand tool for passing wire up to about ten gauge electrical wire in size through a barrier wall in a vehicle, comprising:

a) using a hand tool having no moving parts, consisting of
a longitudinally extended, elongated handle suitable for fitting in and being held across the palm of the user's hand gripped by the user's fingers and held in the user's hand when in use and having a bottom, proximal end and a top, distal end, and an interior channel extending longitudinally completely through the handle from end-to-end, with said channel having two portions with different sizes, a smaller, interior size portion toward said bottom end and a larger, interior size portion at said top end, with a blocking flange, shoulder shelf portion extending about at least a substantial part of the interior periphery of said channel between said two interior portions, said smaller interior size having an inner size approximately equal to that of the exterior size of ten gauge electrical wire; and a longitudinally extended, elongated shaft, hollow from end-to-end and also having an interior size approximately equal to the exterior size of ten gauge electrical wire, said elongated shaft having a bottom, proximal end portion and a top, distal end portion, said channel and said hollow of said shaft being in open communication with one another, allowing up to about ten gauge wire in size to be passed completely through the tool from end-to-end of the tool from said bottom end of said handle through said top end of said shaft, said bottom portion extending down into said handle into said larger interior size portion, abutting against said flange, shoulder shelf portion and affixed to said larger interior size portion, said shaft being restricted from ever extending all the way through to said bottom portion of said handle by said blocking flange, shoulder shelf portion; and b) using said hand tool by holding said handle across the palm of the user's hand gripped by the user's fingers and thereby held in the user's hand and pushing hard against its handle to provide entrance through the barrier wall, while using said flange, shoulder shelf portion as a physical, mechanical stop to prevent said bottom portion from being able to move down and protrude out of said bottom handle end to injure the user of the tool, as the user pushes hard on the tool to move said top end portion of said tube through the barrier wall, said handle and shaft being always static and fixed with respect to one another. having no moving parts in use.

* * * * *